A. ANDERSON.
DUST ARRESTER AND THE LIKE.
APPLICATION FILED DEC. 1, 1917.

1,303,008.

Patented May 6, 1919.
3 SHEETS—SHEET 1.

A. ANDERSON.
DUST ARRESTER AND THE LIKE.
APPLICATION FILED DEC. 1, 1917.
1,303,008.
Patented May 6, 1919.
3 SHEETS—SHEET 2.
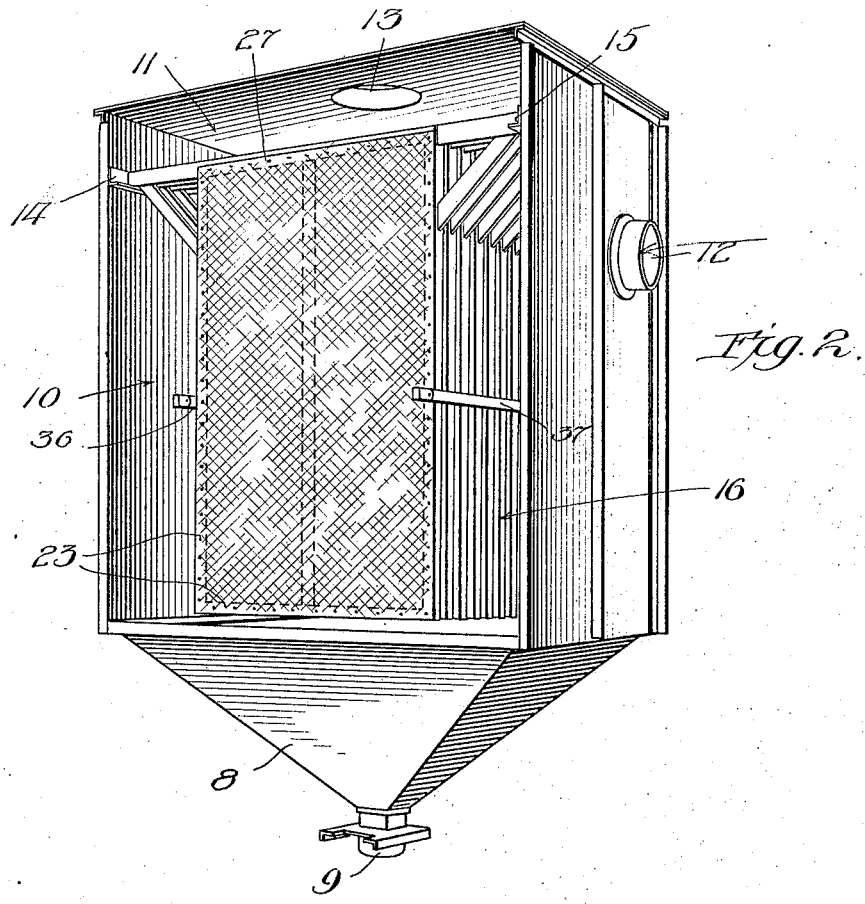
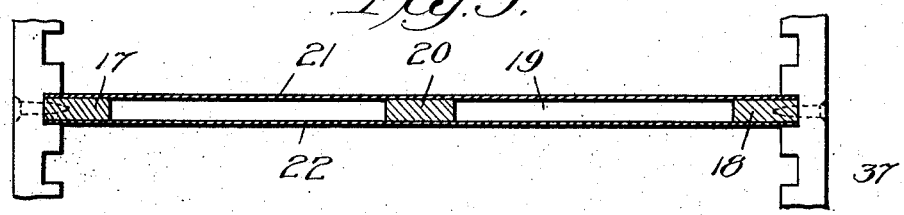

A. ANDERSON.
DUST ARRESTER AND THE LIKE.
APPLICATION FILED DEC. 1, 1917.
1,303,008.
Patented May 6, 1919.
3 SHEETS—SHEET 3.
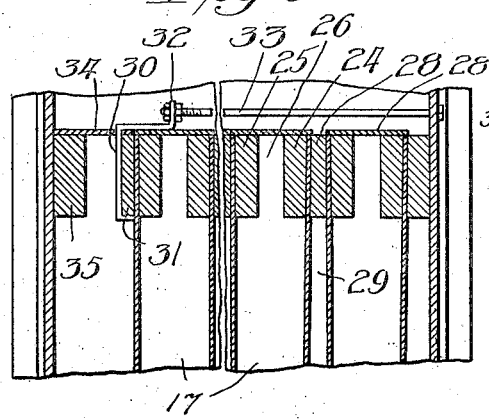
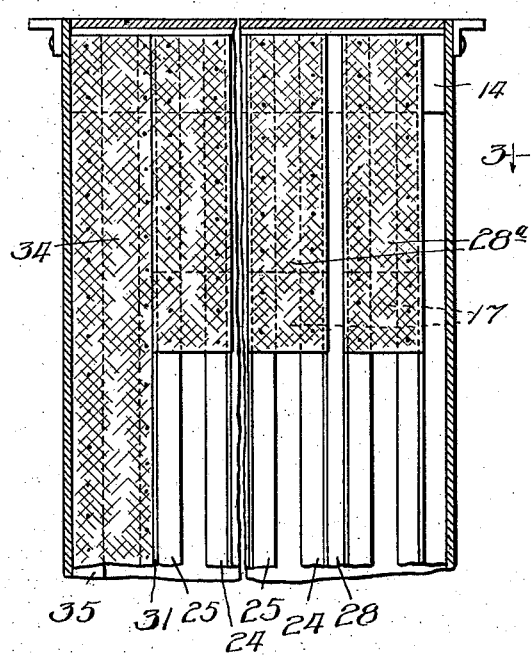
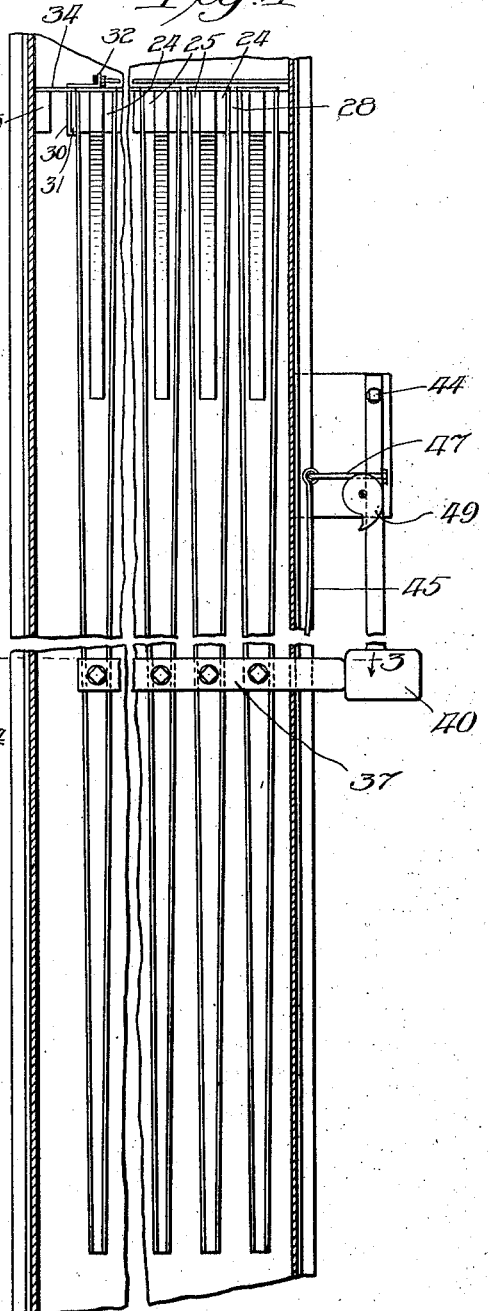

UNITED STATES PATENT OFFICE.

ALFRED ANDERSON, OF QUINCY, ILLINOIS.

DUST-ARRESTER AND THE LIKE.

1,303,008.     Specification of Letters Patent.     Patented May 6, 1919.

Application filed December 1, 1917. Serial No. 204,844.

*To all whom it may concern:*

Be it known that I, ALFRED ANDERSON, a citizen of the United States, residing at Quincy, in the county of Adams and State of Illinois, have invented certain new and useful Improvements in Dust-Arresters and the like, of which the following is a specification.

The present invention has to do with certain improvements in dust arresters and the like, the same being used for removing dust and other impurities suspended in the air undergoing treatment. In various manufacturing industries, such as in foundries and enameling establishments, a considerable amount of dust and other impurities are carried in suspension in the air. This dust is, of course, injurious to health. Consequently, efforts are made to carry the dust away from the regions being occupied by mechanics and other workmen. If the air containing these impurities in suspension be delivered outside of the building, it will be necessary to replace the air so delivered by other fresh air coming in from the outside of the building. This fresh air will naturally be at the outside temperature, and, therefore, in the winter time it will be necessary to raise the temperature of a volume of air equal to the amount discharged to the outside, through a number of degrees of temperature equal to the difference between the internal and external temperatures. This will entail a considerable loss of heat energy and will result in a largely increased cost of heating the inclosure.

On the contrary, if suitable means be provided for purifying the air to such an extent as to make it proper and safe for reception into the lungs, it will be possible to discharge such purifying air back into the inclosure, thereby saving the heat which would otherwise be necessary to raise the temperature of air freshly admitted from the outside.

One of the objects of the present invention is to provide an air purifier or filter capable of so perfectly and completely removing the particles of dust as to make it safe to discharge the purified or filtered air back into the inclosure where the workmen are engaged.

Any machine or device of this character will necessarily become fouled after a period of operation to an amount or extent dependent upon the amount of air passing through and the amount of matter contained in suspension. Means must, therefore, be provided for cleaning the filter from time to time in order to remove the impurities, and one of the objects of the present invention is to provide a very simple arrangement for permitting the removal of these impurities from time to time. Since in many cases the filter will become fouled to a considerable extent after a day's operation, it is very desirable to be able to remove the impurities from the filtering surfaces without the necessity of taking down the filter or disassembling it to any extent. Therefore, another object of the invention is to so arrange the parts that the removal of the impurities from the filtering surfaces can be effected without having to enter the filter or disassemble any portion of it.

Another feature of the invention has reference to the provision of a construction such that the size or capacity of the filter and the total amount of the filtering surfaces can be regulated or determined by the simple expedient of adding filtering units to the structure within a common inclosure. Therefore, another object of the invention is to provide an arrangement whereby the total amount of filtering surface can be very simply determined by the use of standard parts or parts of standard construction.

Other objects and uses of the invention will appear from a detailed description of the same which consists in the features of construction and combinations of parts hereinafter described and claimed.

Referring to the drawings:

Fig. 2 is a view similar to Fig. 1, with the exception that the front plate and associated mechanism has been removed, so as to reveal the interior construction;

Fig. 3 is a detail cross section through one of the filtering units taken on line 3—3 of Fig. 4 looking in the direction of the arrow;

Fig. 4 is a vertical fragmentary side elevation of the interior of a portion of a filtering structure embodying the features of the present invention. In this view some of the intermediate filtering sections have been cut away or removed so as to foreshorten the figure;

Fig. 5 shows a fragmentary detail vertical section through the upper portions of several units so as to better reveal the detail construction of the same: and Fig. 6 shows a fragmentary detail plan view of a portion of the upper surfaces of the filtering units, a number of the intermediate units being broken away so as to foreshorten the figure.

Figure 1:
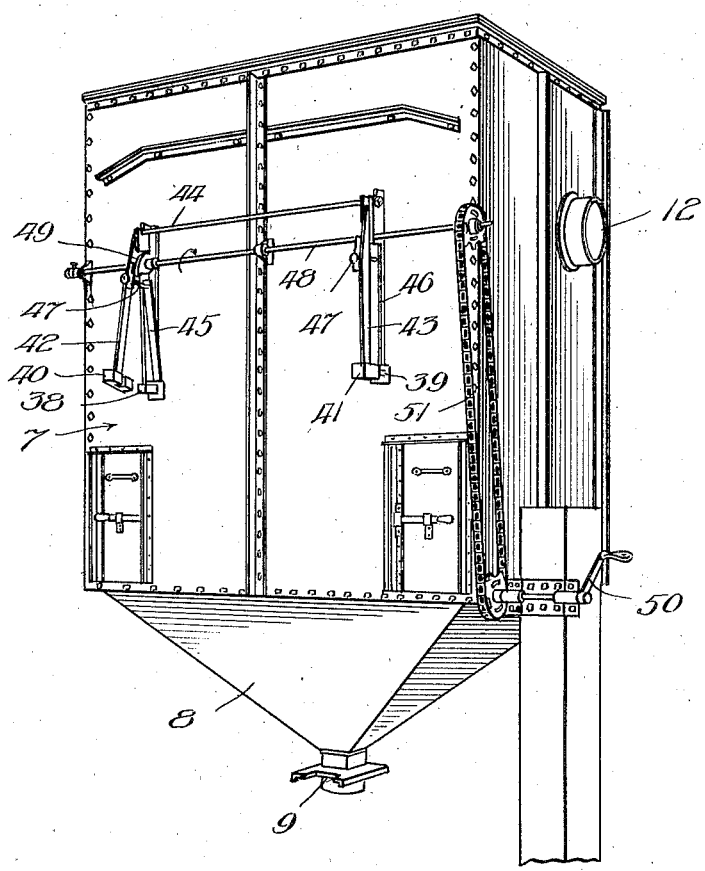
Figure 1 shows a perspective view of a filtering box containing the filtering surfaces and units embodying the features of the present invention.

Referring now to the several figures, the filter of the present invention embodies the use of one or more filtering units, each of which is provided with canvas or other suitable porous surfaces or walls through which the air passes and by which the dust is filtered or removed onto the surfaces. A suitable inclosure is provided for directing the dust or impurity laden air onto the outside surfaces of the filtering unit or units, and means are provided for directing the removal of the purified air from the interior of the unit or units.

In the construction illustrated in the drawings, there is provided a boxlike inclosure 7 having in its lower portion a dust collecting or receiving hopper 8. This hopper may be provided with a damper or valve 9 of any suitable construction, for permitting the removal of the material collected in the hopper.

The interior of the inclosure 7 is divided into a pair of chambers 10 and 11, as shown in Fig. 2. The connection 12 permits the delivery of the dust or impurity laden air into the chamber 10, while the connection 13 provides for the removal of the purified air from the chamber 11. The interior of the inclosure 7 is divided into these chambers by a partition, which partition, in the construction shown in the drawings, comprises a portion of the filtering units themselves. Furthermore, in the arrangement shown in the drawings, the chambers 10 and 11 are located one above the other, but this arrangement is shown largely as a matter of convenience and is not to be considered in any way a limitation, except as may be provided in the claims.

Along the upper portion of the inclosure 7 are supports 14 and 15, which, in the construction illustrated, take the form of angle bars or the like. On these supports are hung or suspended the filtering units 16 in the manner shown in Fig. 2. These filtering units have their side walls or surfaces made of canvas or other suitable fabric or filtering material, so that the air, in order to pass from the chamber 10 to the chamber 11, is compelled to find its way through these filtering surfaces.

Referring now to Figs. 3, 4, 5 and 6, I will describe in detail the construction of the filtering units. Each of these units comprises a pair of side bars 17 and 18 in conjunction with a bottom bar 19, which bars together provide a U-shaped frame open at the top but closed on two sides and the bottom. As a matter of convenience in construction, and for the purpose of further reinforcement, I have also shown a central vertical bar 20 extending upwardly from the bottom bar 19, as shown in Fig. 3. This central bar 20 may in many cases be eliminated. However, where the filtering surfaces are large or the air pressure is considerable, it may be very desirable to provide the central reinforcement by way of the bar 20 in order to prevent collapsing of the filtering units.

The filtering surfaces 21 and 22 are mounted upon and supported by the frame bars above described. These filtering surfaces may be of any desired material, such as canvas or the like. They are firmly fastened to the bars 17, 18 and 19 in an air tight manner, as by the use of glue, as indicated by the border stripes 23 in Fig. 2.

The upper portions of the side bars 17 and 18 are recessed, as shown in Fig. 5, for the accommodation of the top cross bars 24 and 25, which bars, nevertheless, are separated a sufficient distance to provide the air discharge passage 26 between them. The bars 24 and 25 extend beyond the bars 17 and 18 a sufficient distance to permit them to be supported directly on the supports 14 and 15, as shown in Fig. 2. The upper edges of the canvas surfaces 21 and 22 are attached to these bars 24 and 25, as shown by the stripe 27 in Fig. 2.

The filtering units, constructed as above described, are set into place on the supporting bars 14 and 15, with the intermediate spacer bars 28 between them. These spacer bars may extend the full width of the inclosure and serve to separate the upper portions of consecutive units from each other, as shown by the spaces 29 in Figs. 4, 5 and 6. Consequently, the upper portions of the filtering units, in conjunction with the intermediate bars 28, serve to provide the partition aforementioned, which partition, however, is broken by the presence of the passage 26 in the upper portions of the filtering units.

The side bars 17 and 18 on the filtering units taper in width from top to bottom, as shown in Fig. 4, so that the spaces 29 increase in width correspondingly. Therefore, the cross sections of the spaces 29 are greater in the lower portion of the structure than in the upper portion thereof, whereas the cross section of the spaces within the filtering units are smaller in the lower portion of the structure than in its upper portion. This is a desirable arrangement, for the reason that as the air rises around the filtering units it is passed through the walls of the units, so that the volume of air within the units is constantly increasing, as the upper portions of the units are reached, the air within the spaces 29 simultaneously decreasing in equal amount.

The theoretically perfect arrangement would be one in which the horizontal cross sectional area of the lower portions of the units would be zero, the entire cross sectional area at this point being taken up by the spaces 29, the cross sectional area within the units increasing uniformly until at their upper portions the entire space would be so consumed, the spaces 29 becoming zero or tapering out at the upper ends of the units. This theoretically desirable arrangement is approximated in the practical construction herein illustrated.

In order to make the aforementioned partition air tight, the upper portions of the filtering units and the blocks 29 should be forced into solid engagement. For this purpose I have provided clamping bars 30, which hook over an end bar 31 on the upper portion of the end unit, said clamping bars being provided with eyelets 32 for the accommodation of the tightening bolts or rods 33. By drawing up the rods 33, the units and intermediate bars 29 will be clamped together. A strip of canvas 34 or the like may then be passed from the end unit to a bar 35 on the end wall of the inclosure so as to prevent the escape of air upwardly from the chamber 10 to the chamber 11 without passing through the filtering units. If desired, strips of canvas 28ª may be fastened over the end or exposed portions of the bars 24 and 25 so as to still further improve the air tight connection at this point.

It was previously explained that it is very desirable to provide means for removing the dust or impurities collected on the filtering surfaces without the necessity of dismantling the structure or even entering the same. It is to be observed that the filtering surfaces stand in a nearly vertical position, and in fact they incline slightly outward so that the dust which may be removed from them will fall straight down between the filtering units and into the hopper 8. Since the air passing through the structure is practically dry, the dust does not adhere to the canvas or other filtering surface very tenaciously, and it can be removed by jarring these surfaces vigorously. I have, therefore, provided means for accomplishing this result.

In the particular arrangement illustrated, I provide bars or tie rods 36 and 37 at the two sides of the structure, the facing edges of these bars being notched, as shown in Fig. 3, for the accommodation of the edge portions of the filtering units to which they are connected. The ends of these bars project through the front wall of the inclosing structure, as shown at 38 and 39 in Fig. 1. These projecting end portions may be capped with iron blocks so as to increase their life and to better transmit the impacts which are delivered onto them.

The bars 36 and 37 are to be vigorously jarred by hammer blows or the like so as to simultaneously shake all of the units and thereby release the accumulated material. This jarring is conveniently accomplished by the use of hammers 40 and 41 mounted on the lower ends of the arms 42 and 43, the upper ends of which are pivoted to the structure on the line 44. Springs 45 and 46 have their lower ends attached to the inclosing structure and their upper or free ends attached to the bars 42 and 43 respectively, as by the use of tie bolts 47. These springs tend to draw the hammers toward the exposed end portions of the bars 36 and 37 so as to deliver very heavy blows upon them. A cam shaft 48 is journaled to the inclosing structure and carries the cams 49 mounted in position to engage suitable contacting portions of the arms 42 and 43. As the cam shaft 48 is rotated in the direction of the arrow shown in Fig. 1, these cams raise the hammers 40 and 41 alternately so as to deliver blows consecutively onto the two bars.

A crank 50 serves as a convenient means for rotating the cam shaft through the medium of the chain 51 and suitable sprockets. Ordinarily, the operation of the hammer mechanism will only be carried forward for a few minutes each day, this being generally sufficient to release the impurities collected during the preceding twenty-four hours.

While I have herein shown and described only a single embodiment of the features of my invention, still I do not limit myself to the said embodiment, except as I may do so in the claims.

I claim:

1. In an air filter, the combination with a casing constituting a chamber having an inlet opening and a discharge opening, of a dust receptacle in the lower portion thereof, a series of filter units pivotally mounted within the chamber and having vertical filter surfaces adapted to collect dust or other impurities on their outer faces in the passage of air therethrough from the inlet to the discharge opening, horizontal bars joining together said filter units and projecting to the outside of the casing, hammers corresponding to said bars and pivotally mounted in position for impact against the exposed ends of the bars, and cam mechanism for alternately swinging the hammers away from a vertical position and for thereafter releasing them to deliver impacts against the exposed ends of the bars, substantially as described.

2. In an air filter, the combination with a casing constituting a filter chamber and having inlet and discharge openings, of a series of filter units suspended within said casing and having vertical filter surfaces adapted to collect dust and other impurities on their outer faces, bars connecting the filter units and extending to the outside of the casing, hammers pivoted to the casing in position to deliver swinging impacts against the exposed ends of the bars. and cam mechanism in conjunction with the hammers for alternately swinging them to deliver such impacts, substantially as described.

3. In an air filter, the combination with a casing constituting a filter chamber and having inlet and discharge openings, of a series of filter members suspended within the casing and having filter surfaces lying in planes away from the horizontal, bars connecting the filter units together and extending to the outside of the casing, and pivotally mounted hammers in conjunction with said bars mounted in position to deliver impacts to the exposed ends of the bars, and means for operating said hammers in succession, substantially as described.

ALFRED ANDERSON.